Sept. 26, 1939.   F. W. PARKHILL   2,173,950
LOCKABLE CASTER ASSEMBLY
Filed Feb. 14, 1938

INVENTOR,
Frederic W. Parkhill.
BY
Harvey F. Hamilton
ATTORNEYS.

Patented Sept. 26, 1939

2,173,950

UNITED STATES PATENT OFFICE 2,173,950

LOCKABLE CASTER ASSEMBLY

Frederic W. Parkhill, Kansas City, Mo., assignor of one-fourth to Harman R. Brown and one-fourth to Walter E. Ludwig, both of Kansas City, Mo.

Application February 14, 1938, Serial No. 190,480

7 Claims. (Cl. 16—21)

This invention relates to lockable caster assemblies in the nature of those adapted to be attached to articles of furniture or the like, which are provided with cavities in the legs or pedestals thereof, which cavities receive a portion of the caster assembly for the purpose of securing the same in place.

One of the important aims of this invention is to provide a caster assembly of the aforementioned character which has novel and specially constructed expanding elements thereon for engaging the inner surface of a receiving cavity; that has a ball and ball holder pivotally carrier by that portion of the caster assembly projecting from the aforesaid cavity; and which has specially formed means between the aforesaid holder and the expanding elements for moving the latter to and from an operative position without disassembling the caster.

A yet further aim of the instant invention is the provision of a caster assembly which is adapted to receive and operably support a selected character of floor engaging element, said element being, for example in the form of a ball, or a wheel said floor engaging elements having no bearing upon the specific structure of the remaining parts of the caster assembly and each being attachable to the pintle thereof during manufacture without altering the pintle.

A still further object of this invention is to provide a caster assembly of the aforementioned type which is susceptible of being cheaply manufactured; that is strong and durable during use; and which contains no parts likely to get out of order or to become inoperative through prolonged and hard usage.

A large number of minor objects will appear during the course of the following specification, referring to the accompanying drawing wherein but two of the specific forms of the invention are illustrated and wherein, Figure 1 is a side elevation of a caster assembly embodying the present invention.

It is well-known in this art that caster assemblies having various types of expanders have been used for engaging the inner faces of furniture legs or pedestals that are provided with cavities. In most of the commonly used caster assemblies, the anchoring elements therein become loosened and therefore, fail after being subjected to hard use and it is virtually impossible to adjust the caster so that it will remain in normal position.

Special tools are also oftentimes necessary in placing these casters, all of which creates an objectionable feature that a caster embodying this invention will overcome.

Figure 1:
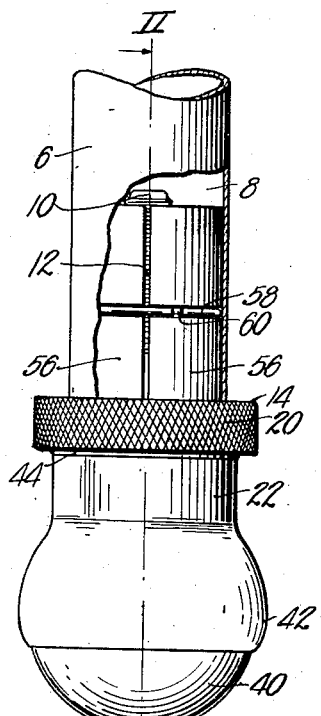
Figure 2:
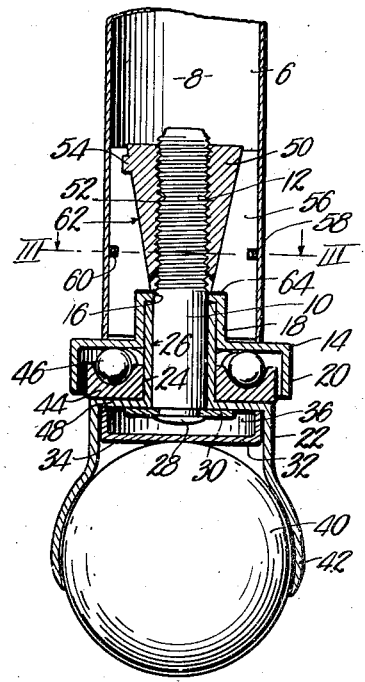
Fig. 2 is a vertical longitudinal sectional view through the said assembly taken on line II—II of Fig. 1.
Figure 3:
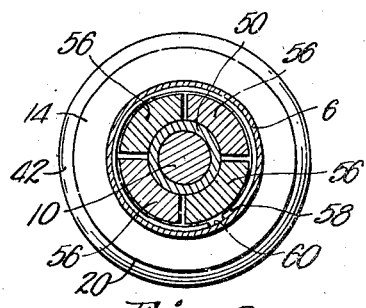
Fig. 3 is a cross sectional view through the assembly taken on line III—III of Fig. 2; and, Fig. 4 is a side elevation of a caster assembly showing another type of floor engaging element thereon, parts being broken away to reveal certain structural features.

Without regard to size and materials, and bearing in mind that the specific nature of the parts described might be different in physical form, attention is now drawn to Figs. 1 to 3 inclusive wherein the numeral 6 designates the leg or pedestal of any article to be supported, which leg has a cavity 8 therein for the reception of the upper portion of the caster assembly. The inner face of leg 6 forms a tube circular in transverse cross section and therefore, the parts forming the securing means, must be made to conform to this contour. Obviously, the relation of the securing parts and cavity 8 might be altered to suit the desire of the maker.

Pintle 10 is provided with screw threads 12 along a portion of its length and has a cap 14 rigidly secured thereto intermediate its ends and close to what is normally the lower end of the pintle. The perforation 16 in cap 14 receives pintle 10 and when the two parts are in the desired relation, cap 14 may be welded or otherwise secured in place. An annular wall 18 is formed by offsetting cap 14 and its outer annular edge is provided with a depending flange 20.

A holder 22 having a boss 24 integral therewith is pivotally mounted upon the lower end of pintle 10. Boss 24 has a bore 26 therethrough to receive the lower end of pintle 10 and after the pintle has been moved to position, the same is riveted or otherwise spread as at 28 to secure a washer 30 in place.

A flanged plate 32 having a planar surface 34 occupies a position in the bottom of cup shaped holder 22 and affords a cavity 36 to house the riveted portion 28 of pintle 10 and washer 30. Thus, when ball 40 is in place in holder 22, the spherical surface thereof engages planar surface 34, which is always disposed in a plane tangent to the outer spherical surface of ball 40. The marginal annular edge 42 of holder 22 is arched inwardly and terminates slightly below a horizontal plane passing through the center of ball 40. Thus, ball 40 cannot be withdrawn from holder 22 and it is retained in place with its spherical surface in close proximity to planar surface 34.

An annular ball race 44 is provided on the upper side of the inner wall of holder 22 for the reception of a plurality of anti-friction balls 46. This ball race 44 in the illustrated embodiment herewith is a separate piece which rests upon wall 48.

Boss 24 extends along pintle 10 and a portion thereof is circumscribed by annular wall 18 of cap 14. Balls 46 lies between cap 14 and wall 48 and through this particular construction, there is provided a rigid assembly which will not give way when the caster is put to hard use.

The inner screw threaded portion of pintle 10 carries an expander element 50. This expander element is conical in form and has a screw threaded bore 52 extending therethrough at its major axis. Expander 50 is in screw threaded engagement with pintle 10 and will move longitudinally therealong as the pintle is rotated.

A radially extended lug 54 integral with expander 50, extends between two of the segmental jaws 56 that are associated with expander 50 in a special manner. In the instant shown, jaws 56 are held against expander 50 by a spring 58 which rests in grooves 60 formed inwardly from the outer arcuate surfaces of the jaws. Four jaws 56 are provided and the inner inclined faces 62 thereof, lie against the outer face of element 50.

A shoulder 64 on each jaw 56 respectively, rests upon cap 14 in the manner shown in Fig. 2 so that a minimum amount of friction is presented even though the jaws 56 are all amply supported. As element 50 is moved downwardly along pintle 10, shoulders 64 against cap 14, insure that jaws 56 will move radially only.

Annular flange 20 of cap 14 may be knurled as shown in Fig. 1 so as to afford a grip for the operator and when this cap, and therefore pintle 10 is rotated, jaws 56 will be definitely forced out against the inner surface of leg 6 so as to secure the caster assembly in place. After this securement has occurred, holder 22, boss 24 and ball 46 will rotate together about the axis of pintle 10. Ball 46 is free to move about its center in any direction while it is being retained by holder 22 and therefore, the caster assembly will serve its purpose most efficiently.

Figure 4:
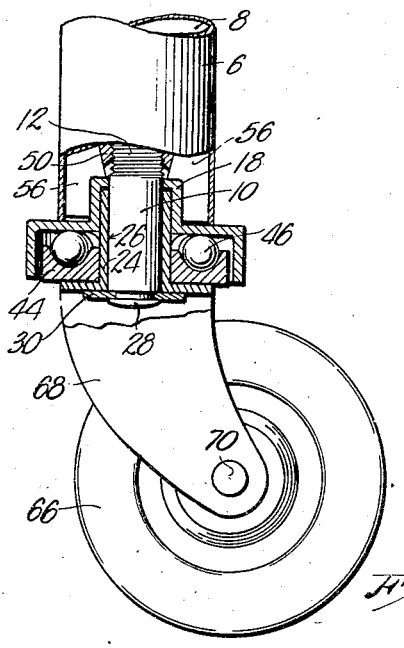

Caster assemblies having different types of floor engaging elements may be used without changing the structure above described. As an example of this advantage, Fig. 4 illustrates a wheel 66 mounted in yoke 68 by the transverse axle 70.

While this form of the invention has been illustrated and described, it is to be understood that the specific details so disclosed, are for the purpose of teaching the principles only, and it is desired therefore, to be limited merely by the spirit of the invention and scope of the appended claims.

Having thus described the invention, what is claimed as new and desired to be secured by Letters Patent is:

1. In a caster assembly of the character described, a pintle adapted to secure the caster in operative position; a substantially cup shaped holder having an opening therein to receive one end of the pintle at the bottom thereof opposite its open side, said holder having its axis in alignment with the axis of said pintle; a flanged plate in the holder to cover the one end of the pintle and to present a smooth face in the lower portion of the holder; means on the end of the pintle for securing the pintle and holder together; and a ball mounted for free rotation within the holder in frictional contact with the smooth face of the plate, the flanges of said plate serving to hold the plate in spaced relation to the end of the pintle and said securing means.

2. In a caster assembly of the character described, a pintle; a cap in spaced relation to one end thereof; means between the cap and the other end of the pintle for securing the caster in operative position; a cup shaped holder pivotally secured to the pintle between said cap and the first mentioned one end thereof; a plurality of anti-friction members between portions of said cap and the holder; and a ball mounted for free rotation within the holder said cap and the holder having telescoped tubular portions thereof circumscribing the pintle and flat opposed portions forming the portions thereof between which the anti-friction members are disposed.

3. In a caster assembly of the character described, a pintle; a cap in spaced relation to one end thereof; means between the cap and the other end of the pintle for securing the caster in operative position; a cup shaped holder pivotally secured to the pintle between said cap and the first mentioned one end thereof; a plurality of anti-friction members between a portion of said cap and a part of the holder; and a ball mounted for free rotation within the holder, said holder having a boss provided with a bore to receive the pintle, said cap having an annular wall circumscribing a portion of said boss and in close proximity therewith to prevent lateral displacement, said anti-friction members being in a continuous path around the other portion of said boss to receive the load.

4. In a caster assembly of the character described, a pintle; a cap in spaced relation to one end thereof; means between the cap and the other end of the pintle for securing the caster in operative position; a cup shaped holder pivotally secured to the pintle between said cap and the first mentioned one end thereof; a plurality of anti-friction members between a portion of said cap and a part of the holder to receive the load; and a ball mounted for free rotation within the holder, said holder having a boss provided with a bore to receive the pintle, said cap having an annular wall circumscribing a portion of said boss and in close proximity therewith to prevent lateral displacement, said holder having a ball race on the face thereof around the said boss and and opposed to said cap, said anti-frictional members being within said race and maintained therein by said cap.

5. In a caster assembly of the character described, a pintle; a cap in spaced relation to one end thereof; means between the cap and the other end of the pintle for securing the caster in operative position; a cup shaped holder pivotally secured to the pintle between said cap and the first mentioned one end thereof; a plurality of anti-friction members between said cap and the holder; and a ball mounted for free rotation within the holder, said cap being rigid to the pintle for rotation therewith and provided with an annular wall circumscribing a portion of the pintle, said cap having a perforated boss integral therewith for receiving the pintle, said boss having a portion thereof extending between the annular wall and the pintle, said anti-friction members being in a path circumscribing the portion of said boss externally of the annular wall.

6. In a caster assembly of the character described, a pintle adapted to secure the caster in operative position; a ball; a substantially cup-shaped holder for the ball having a flat inner surface at the bottom thereof opposite its open side, the annular side wall of said holder having an inturned marginal portion at the edge thereof embracing the ball and serving to hold the spherical surface of the ball in close proximity to the said flat bottom of the holder whereby the latter is disposed tangently to the spherical surface when the caster is in the normal position; a boss on said holder provided with a bore to receive the pintle whereby the holder is carried for rotation about its axis; a cap rigidly secured to the pintle having an annular wall circumscribing a portion of the boss; and anti-friction members between a portion of the cap and the bottom of said holder, said cap having a continuous depending flange circumscribing the anti-friction members.

7. In a caster assembly of the character described, a pintle adapted for entrance into the cavity at the bottom of a depending load-carrying pedestal; a holder for a floor-engaging member pivotally carried by said pintle; a cap secured to said pintle between said holder and the pedestal in spaced relation to the holder; and a plurality of anti-friction members between the cap and said holder to receive the load, said holder having an upwardly extending boss circumscribed by the anti-friction members and circumscribing an appreciable amount of the length of the pintle, said cap having an annular wall circumscribing a portion of the boss and an annular depending flange circumscribing the anti-friction members and bridging the space between the cap and said holder.

FREDERIC W. PARKHILL.